US012257732B2

(12) United States Patent
Korell

(10) Patent No.: US 12,257,732 B2
(45) Date of Patent: Mar. 25, 2025

(54) BREAD CUTTING MACHINE WITH INTEGRATED BAGGING AID, AND OPERATING METHOD

(71) Applicant: Bizerba SE & Co. KG, Balingen (DE)

(72) Inventor: Leo Korell, Balingen (DE)

(73) Assignee: BIZERBA SE & CO. KG, Balingen (DE)

( * ) Notice: Subject to any disclaimer, the term of this patent is extended or adjusted under 35 U.S.C. 154(b) by 216 days.

(21) Appl. No.: 17/781,714

(22) PCT Filed: Nov. 9, 2020

(86) PCT No.: PCT/EP2020/081524
§ 371 (c)(1),
(2) Date: Jun. 2, 2022

(87) PCT Pub. No.: WO2021/110367
PCT Pub. Date: Jun. 10, 2021

(65) Prior Publication Data

US 2023/0010559 A1 Jan. 12, 2023

(30) Foreign Application Priority Data

Dec. 5, 2019 (EP) .................................... 19213885

(51) Int. Cl.
*B65B 25/18* (2006.01)
*B26D 7/27* (2006.01)
*B26D 7/32* (2006.01)

(52) U.S. Cl.
CPC ................ *B26D 7/27* (2013.01); *B65B 25/18* (2013.01); *B26D 2007/327* (2013.01); *B26D 2210/06* (2013.01)

(58) Field of Classification Search
CPC ................ B26D 7/27; B26D 2007/327; B26D 2210/06; B65B 25/18
See application file for complete search history.

(56) References Cited

U.S. PATENT DOCUMENTS 2,031,264 A * 2/1936 Kennebeck ............. B65B 25/18 53/260
2,037,362 A * 4/1936 Beauclerk ............... B65B 25/18 53/260
(Continued)

FOREIGN PATENT DOCUMENTS

DE 9313637 U1 11/1993
DE 4431808 C2 * 4/1997 ............... B26D 7/01
(Continued)

*Primary Examiner* — Thomas M Wittenschlaeger
*Assistant Examiner* — Katie L Gerth
(74) *Attorney, Agent, or Firm* — LEYDIG, VOIT & MAYER, LTD.

(57) ABSTRACT

A bread slicer includes: a slicer housing, accommodating a slicing blade rotatable in a slicing plane, the slicer housing including: a feed chute for introducing the loaf into the bread slicer; and a receiving chute, which adjoins the feed chute except for a blade gap; and a bagging aid configured for slipping packaging over the bagging aid together with the slices of the sliced loaf resting thereon, the bagging aid having a cantilevered portion. External dimensions of the feed chute parallel to the slicing plane are greater than or equal to maximum external dimensions in directions of loaves to be sliced. External dimensions of the cantilevered portion parallel to the slicing plane are smaller than external dimensions of the feed chute parallel to the slicing plane. The receiving chute is the bagging aid having the cantilevered portion and is inside a cover of the slicer housing.

15 Claims, 11 Drawing Sheets

(56) References Cited

U.S. PATENT DOCUMENTS

| | | | | | |
|---|---|---|---|---|---|
| 2,242,935 | A * | 5/1941 | Arhndt | B26D 7/32 | 83/149 |
| 2,528,853 | A * | 11/1950 | Brustowsky | B26D 1/553 | 83/751 |
| 3,451,192 | A * | 6/1969 | Irwin | B65B 25/18 | 53/385.1 |
| 3,491,514 | A * | 1/1970 | Burford | B65B 5/067 | 53/572 |
| 4,759,168 | A * | 7/1988 | Petersen | A21C 15/04 | 83/155.1 |
| 5,148,655 | A * | 9/1992 | Salinas | B26D 7/27 | 53/514 |
| 5,461,956 | A * | 10/1995 | Petersen | B26D 1/16 | 83/241 |
| 2007/0151431 | A1* | 7/2007 | Bassler | B26D 7/2621 | 83/167 |
| 2014/0366696 | A1* | 12/2014 | Weiss | B26D 7/06 | 83/162 |
| 2021/0137154 | A1* | 5/2021 | Schmidt | B05B 13/0221 | |
| 2021/0219592 | A1* | 7/2021 | Claussen | B65B 25/16 | |
| 2021/0269185 | A1* | 9/2021 | Van Cauwenberghe | B26D 7/32 | |
| 2022/0234769 | A1* | 7/2022 | Van Cauwenberghe | B65B 25/18 | |

FOREIGN PATENT DOCUMENTS

| | | | |
|---|---|---|---|
| DE | 202008003603 | U1 | 5/2008 |
| DE | 102010036721 | B4 | 3/2012 |
| DE | 202012009103 | U1 | 10/2012 |
| DE | 102012025385 | A1 | 7/2014 |
| DE | 102014110569 | A1 | 1/2016 |
| EP | 2886269 | A1 | 6/2015 |
| EP | 2937191 | A1 | 10/2015 |
| EP | 3127667 | A1 | 2/2017 |
| EP | 3102376 | B1 | 2/2019 |
| EP | 3331674 | B1 | 10/2019 |

* cited by examiner

BREAD CUTTING MACHINE WITH INTEGRATED BAGGING AID, AND OPERATING METHOD

CROSS REFERENCE TO RELATED APPLICATIONS

This application is a U.S. National Phase application under 35 U.S.C. § 371 of International Application No. PCT/EP2020/081524, filed on Nov. 9, 2020, and claims benefit to European Patent Application No. EP 19213885.7, filed on Dec. 5, 2019. The International Application was published in German on Jun. 10, 2021 as WO 2021/110367 A1 under PCT Article 21(2).

FIELD

The present disclosure relates to a bread slicer for cutting a loaf of bread into slices. The present disclosure further relates to a bread slicing method for cutting off slices from a loaf of bread using a bread slicer of this kind.

BACKGROUND

Bread slicers are disclosed in DE 10 2010 036 721 B4 (=reference [1]) or DE 93 13 637 U1 (=reference [3]).

Bagging aids of bread slicers are typically used as mechanical aids when packaging sliced loaves. In bagging aids, typically the loaf has to be lifted out of the slicing region onto a bagging aid. The bagging aid is generally mounted above the bread slicer in the form of a metal sheet. Users of the bread slicer grasp the loaf at the front and rear ends and press it together it so that the sliced loaf does not collapse when lifted up. Users have to take hold of the bread. In particular in self-service bread slicers, in which users are normally customers in a store, users do not wear suitable gloves for doing so. The process is therefore often not particularly hygienic. In addition, slices of bread are lost time and again, and these then accumulate in the bread slicer throughout the day.

DE 44 31 808 C2 (=reference [2]) discloses a bread slicer in which a loaf is sliced in a chute and can then be removed from the chute sideways by a user through a door and placed on a separate work surface. The sliced loaf can then be packaged on this work surface. This configuration is relatively time-consuming in terms of handling and does not meet high hygiene standards.

DE 93 13 637 U1 (=reference [3]) discloses a slicer for slicing foodstuffs. The foodstuff is guided unsliced past a cutting disk from the top downward in a slightly inclined chute. In the process, the length of the foodstuff is ascertained. The foodstuff is then transported from the bottom upward in the chute and cut into slices by the cutting disk in the process. A holding plate, a supporting plate, and delimiting walls secure the foodstuff in position.

U.S. Pat. No. 2,242,935 A (=reference [4]) discloses a slicer comprising a trough for receiving cut slices from an insertion trough. A slicing blade is located between the troughs. An upright abutment is fastened to the slicing trough and props cut-off slices of bread up in a vertical position. A second abutment, rigidly mounted on the receiving trough, props up the final cut-off slice and moves the slices when manual movement means of the slicer are actuated to displace the receiving trough, so as to remove the slices from the slicing blade.

EP 2 886 269 A1 (=reference [5]) discloses a slicer for food, comprising a slicing blade and a housing having a loading region and a removal region for the food. In the removal region and/or in the loading region there is a packaging apparatus on which the food can be placed such that a packaging bag can be pulled over the packaging apparatus and the sliced food. The packaging apparatus is arranged inside the housing.

EP 3 127 667 A1 (=reference [6]) relates to a method for bagging bread cut into slices. The bread is laid, at a slight incline angle of less than 20° with respect to the vertical, onto an inclined pallet having a stop at its lower end, a bag is pulled over the bread, and the bag together with the bread is removed in an upward motion, with the lower end of the bread being supported.

DE 20 2012 009 103 U1 (=reference [7]) discloses a transportation channel of a bread slicer, comprising a feed channel and a withdrawal channel for receiving slices of bread. A blade is located between the feed channel and the withdrawal channel. The feed channel and the withdrawal channel have a base and a side wall, which prop the bread up. The base and the side face of the withdrawal channel are configured to be pivotable and/or detachable. At least the side wall of the withdrawal channel has a coating that reduces the friction between the bread and the withdrawal channel during transportation of the bread.

Above-cited reference [1] describes a bread slicer in which a loaf is advanced by means of an advancing device onto a slicing apparatus of the bread slicer and is sliced into a pack of slices. The pack of slices is pushed from the slicing region through an opening in a wall of the slicer housing of the bread slicer onto a holding device, generally automatically.

The holding device comprises a cantilevered portion that extends beyond the wall of the slicer housing and thus beyond the bread slicer. If there is a pack of slices on the holding device, a film bag can be pulled over the pack of slices (and over the cantilevered portion) in a simple manner in order to package the pack of slices. The opening is closed by a closure device during the slicing operation. In addition, a cover device covers the feed region for the unsliced loaf.

The bagging-aid configuration stated in reference [1] is relatively complex to use since the bagging aid is formed outside of the slicer housing and is accessible from the interior of the bread slicer only through an opening that can be opened and closed. In addition, after the slicing process the sliced loaf has to be moved into the region of the bagging aid again by means of a displacement operation. Moreover, the bagging aid projects away from the slicer housing, so it enlarges the space required by the slicer and there is also the risk that a person walking past the slicer gets caught on it.

Above-cited reference [3] discloses a slicer having a chute in a slicer housing, from which a sliced loaf can be removed through a door in the slicer housing. Delimiting walls of the chute are located to the side of the loaf. There are holding plates below the bottom end of the loaf and above the top end. The holding plates and delimiting walls are used to hold the sliced loaf in position. In addition, the holding plates, the delimiting walls, and the slicer housing make it difficult to pull a bag over the loaf and to subsequently withdraw the bag together with the loaf therein.

Above-cited reference [4] describes a tapering trough arranged outside of a housing of a slicer for receiving cut bread slices in the form of a bagging aid. A bagging aid of this kind formed outside of a housing is not externally protected from dirt and the application of force.

Above-cited reference [5] relates to a slicer in which a sliced food is first removed from a removal region and then placed on a separate packaging apparatus in the slicer for packaging. The packaging operation is relatively cumbersome due to the conveyance from the removal region to the packaging apparatus.

SUMMARY

In an embodiment, the present disclosure provides a bread slicer that is for cutting a loaf of bread into slices. The bread slicer includes: a slicer housing, which accommodates a drive motor and a slicing blade, which is driven by the drive motor, retained on a blade arm and rotates in a slicing plane or is movable in a circulating manner, the slicer housing including: a feed chute configured to introduce the loaf to be sliced into the bread slicer; and a receiving chute, which adjoins the feed chute except for a blade gap, for receiving all the slices of the sliced loaf; and a bagging aid configured for slipping or pulling a bag-like packaging over the bagging aid together with the slices of the sliced loaf that are resting thereon, the bagging aid comprising a cantilevered portion. External dimensions of the feed chute in directions parallel to the slicing plane are selected to be greater than or equal to maximum external dimensions in directions of loaves to be sliced. External dimensions of the cantilevered portion in the directions parallel to the slicing plane are, at least at a free end remote from the feed chute, selected to be smaller than external dimensions of the feed chute in the directions parallel to the slicing plane. The receiving chute is formed as the bagging aid having the cantilevered portion and is arranged inside a cover of the slicer housing.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
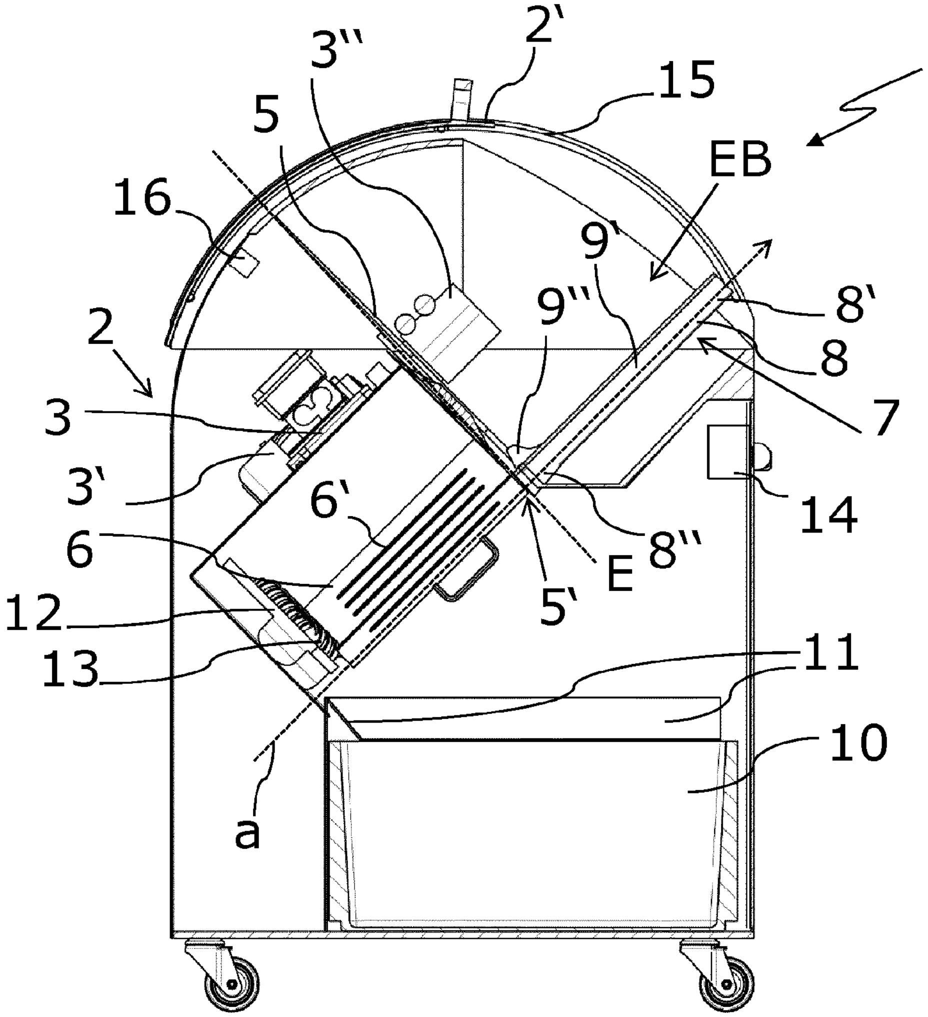
FIG. 1 is a schematic vertical section through a bread slicer according to an aspect of the present disclosure, with the cover open.

The present disclosure relates to a bread slicer for cutting a loaf of bread into slices, comprising a slicer housing, which accommodates a drive motor and a slicing blade, which is driven by said drive motor, retained on a blade arm and rotates in a slicing plane and/or is movable in a circulating manner, comprising a feed chute for introducing the loaf to be sliced into the bread slicer, and comprising a receiving chute, which adjoins the feed chute except for a blade gap, for receiving all the slices of the sliced loaf. The present disclosure further relates to a preferred bread slicing method for cutting off slices from a loaf of bread using a bread slicer of this kind.

Aspects of the present disclosure address the problem, which is relatively challenging when considered in detail, of configuring a generic bread slicer having the features listed at the outset to be more compact and less bulky and to have greater protection for users from accidental contact with the bread slicer, in a structurally simple and material-efficient way.

Aspects of the present disclosure solve this problem in both a surprisingly simple and also effective way in that the external dimensions of the feed chute in directions parallel to the slicing plane are selected to be greater than or equal to the maximum external dimensions in said directions of loaves to be sliced, in that the external dimensions of the cantilevered portion in directions parallel to the slicing plane are, at least at a free end remote from the feed chute, selected to be smaller than the external dimensions of the feed chute in said directions, in that bread slicer has a bagging aid for slipping or pulling a bag-like packaging means over the bagging aid together with the slices of the sliced loaf that are resting thereon, the bagging aid comprising a cantilevered portion, and in that the receiving chute is formed as a bagging aid having a cantilevered portion and is arranged inside a cover of the slicer housing.

In the construction according to an aspect of the present disclosure, the bagging aid is located inside the slicer housing, thereby ensuring a space-saving configuration of the bread machine while reducing structural components and increasing protection for users of the bread slicer.

A bread slicer according to an aspect of the present disclosure having the receiving chute has a region of a bread chute into which a user of the bread slicer loads the loaf, the bread chute in particular comprising the receiving chute and also the feed chute. In the bread slicer according to an aspect of the present disclosure, this region is also the region from which the user removes the sliced loaf. A support sheet formed as a part of the receiving chute or as the entire receiving chute is thus simultaneously a delivery sheet from which the user can remove the sliced loaf.

The region from which the user can remove the sliced loaf is simultaneously used as the bagging aid. In particular, a bagging aid is a holding sheet for the loaf that generally does not extend far beyond the loaf in terms of width, or even is narrower than the loaf. This holding sheet is openly accessible on a narrow side, so that the user can pull a packaging means, in particular a bag, over the loaf as long as the loaf is positioned on the bagging aid. The user moves the bag lengthwise along the longitudinal axis of the loaf. In the bread slicer according to an aspect of the present disclosure, the delivery sheet is in particular formed as the bagging aid.

One category of advantageous embodiments of the bread slicer according to the present disclosure is characterized by an electronic control device, which is configured to cause the unsliced loaf to be transported from the receiving chute into the feed chute past the retracted slicing blade, which has been removed from the blade gap, and then to cause the loaf that is to be sliced to be transported back from the feed chute into the receiving chute, the slicing blade being inserted into and retracted out of the blade gap during the return transportation in such a way that the loaf is cut into parallel slices in the process. In particular, the loaf is loaded into the receiving chute, conveyed into the feed chute, and then transported back into the receiving chute, the loaf being sliced during the return transportation.

Particularly preferred are embodiments of the bread slicer according to the present disclosure that are characterized in that the receiving chute is formed by two sheet metal portions that adjoin each other at an angle and together are L-shaped in cross section. Owing to the L shape, the loaf is supported on two sides. As a result, sufficient support for transporting the loaf is ensured while using little material and adequately controlling the loaf.

The bread slicer according to the present disclosure is preferably configured such that, in parallel with the slicing plane, the receiving chute is, at its end facing the feed chute, almost as wide as the feed chute in that region. This allows for better support of the loaf at the transition from the feed chute into the receiving chute.

A further embodiment of the bread slicer is characterized by a counter-support that can be arranged on the loaf opposite the advancing plate. The counter-support additionally prevents the already-sliced loaf from falling over.

The bread slicer is preferably configured such that a connecting axis between the feed chute and the receiving chute is arranged in a manner inclined with respect to the vertical, preferably by approximately 45°. The oblique orientation prevents the sliced loaf from falling over. The bread slicer can be configured to have a smaller footprint than when the feed chute is oriented horizontally. When the loaf is transported in this manner, there is also no need for a counter-support opposite the advancing plate, said counter-support being intended for preventing the bread from tipping over and being moved by the advancing plate and the bread or otherwise displaced along with the advancing plate in parallel therewith. In general, a counter-support of this kind would need to be removed first when loading the bread.

Embodiments of the present disclosure in which the blade arm is configured to move the slicing blade on a curve, preferably a circular curve, are also particularly preferred. This allows the slicing blade to be inserted into the loaf periodically, thereby reducing vibrations in the bread slicer.

Further especially advantageous embodiments of the present disclosure are characterized in that through-slots are formed in the feed chute for breadcrumbs to fall through. The breadcrumbs can then in particular fall into a crumb compartment below the feed chute and be collected and removed, thereby making the bread slicer easy to clean.

Developments of these embodiments in which a crumb compartment, in particular having a deflector sheet, is arranged below the through-slots in the feed chute are also particularly preferred. The crumb compartment is used to collect the breadcrumbs produced during the slicing process. In particular, the deflector sheet is oriented so as to point obliquely outward from the edge of the crumb compartment in order to catch as many falling breadcrumbs as possible and guide them into the crumb compartment. Owing to the vibrations that constantly occur during the slicing process, the breadcrumbs primarily fall into the crumb compartment and do not remain in the feed chute or receiving chute. In this way, the feed chute and receiving chute are, so to speak, cleaned mechanically and automatically during the slicing process itself. To simplify the cleaning, the advancing plate can be moved so far that a spacing is formed between an advancing plate and the end of the feed chute remote from the receiving chute, in particular in the direction of the connecting axis between the feed chute and the receiving chute.

Also advantageous are embodiments of the bread slicer according to the present disclosure in which an advancing plate having a gripper for holding the loaf is provided, which advancing plate can travel from one end of the feed chute remote from the receiving chute as far as over the blade gap and back again, and on which the loaf introduced into the feed chute rests by its end face. During the slicing process, the loaf is primarily secured by the gripper in that the gripper reaches into the loaf, in particular using claws. In particular, the slicing blade is moved into the blade gap before the slicing process. The advancing plate together with a loaf resting thereon is moved toward the slicing blade until the loaf rests on the slicing blade. The advancing plate and the slicing blade secure the loaf. Next, the claws of the gripper are inserted into the loaf in order to hold the loaf during the slicing process. In this case, the claws of the gripper can be formed to be relatively small.

In alternative or additional embodiments of the bread slicer according to the present disclosure, the slicing blade, when in a non-activated state outside of the blade gap, is arranged in the bread slicer so as to be impossible to touch from outside of the cover of the slicer housing. This gives users additional protection from the sharp slicing blade.

Further advantageous embodiments of the present disclosure are characterized in that the receiving chute is arranged such that, before the slicing process, an unsliced loaf can be placed onto the cantilevered portion by a user, and in that, after the slicing process, the slices of the sliced loaf can be removed from the cantilevered portion by the user, preferably after having pulled a bag-like packaging means thereover. This allows the bread slicer to be configured in a particularly space-saving manner.

Further advantageous embodiments are characterized in that the bread slicer has a shorter side and a longer side, the cantilevered portion and an input device for the electronic control device being accessible to a user from the shorter side of the bread slicer. This is particularly advantageous if the bread slicer is intended to be installed in a space-saving manner in the self-service area of a supermarket. In this case, and in particular to save space, the bread slicer is oriented between shelving such that the shorter side of the bread slicer extends in parallel with the direction along the shelving, whereas the longer side of the bread slicer is oriented in the direction of the depth of the shelving. To save space, with the feed chute and receiving chute oriented obliquely, the longer side of the bread slicer can be configured to be shorter than in a bread slicer in which the feed chute and the receiving chute are installed horizontally.

A further preferred embodiment of the bread slicer according to the present disclosure is characterized in that the cover of the slicer housing is movable in a rotational motion on a guide rail. This allows the opening mechanism for the bread slicer to be configured in a space-saving, compact, and simple manner.

The bread slicer according to the present disclosure preferably has a sensor for switching off the bread slicer, in particular the slicing blade, in an emergency. This contributes to greater safety for users of the bread slicer. The sensor can in particular be arranged on the cover of the bread slicer. Alternatively or additionally, a locking apparatus that keeps the cover of the slicer housing closed during the slicing operation can also be provided.

The bread slicer according to the present disclosure is primarily configured for self-service operation by customers in a grocery store or a bakery.

A preferred bread slicing method for cutting off slices from a loaf of bread by means of a bread slicer according to the present disclosure in accordance with any of the above-described embodiments is characterized by the following steps:

- a) introducing an unsliced loaf into the feed chute, preferably via the receiving chute;
- b) cutting the loaf into slices;
- c) conveying the slices to the cantilevered portion of the receiving chute;
- d) pulling a bag-like packaging means over the bagging aid of the cantilevered portion together with the slices of the sliced loaf that are resting thereon, while the cover of the slicer housing is open;
- e) removing the bag-like packaging means, together with the slices of the sliced loaf contained therein, from the cantilevered portion.

In a bread slicing method of this kind, the sliced loaf can be removed in a space-saving and particularly simple manner.

Further advantages of the present disclosure become apparent from the description and the drawings. According to the present disclosure, the aforementioned features and those yet to be stated can likewise each be used either in isolation or together in any combinations. The embodiments shown and described should not be taken to be an exhaustive list, but rather are intended as examples for outlining the present disclosure.

The present disclosure concerns a bread slicer for cutting a loaf of bread into slices, comprising a bagging aid that is integrated in a space-saving manner.

Figure 6:
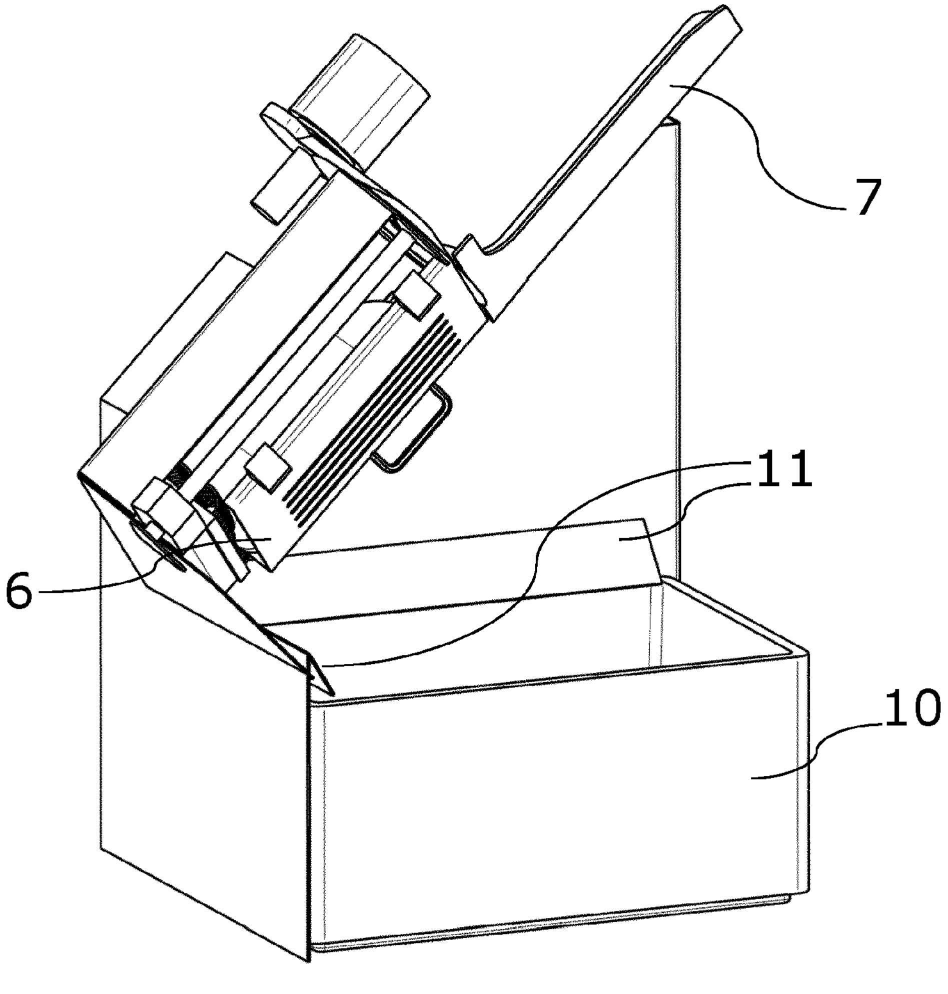
FIG. 6 is a three-dimensional schematic view of a feed chute, a receiving chute, a slicing blade, and a crumb compartment of the bread slicer according to an aspect of the present disclosure.
Figure 7:
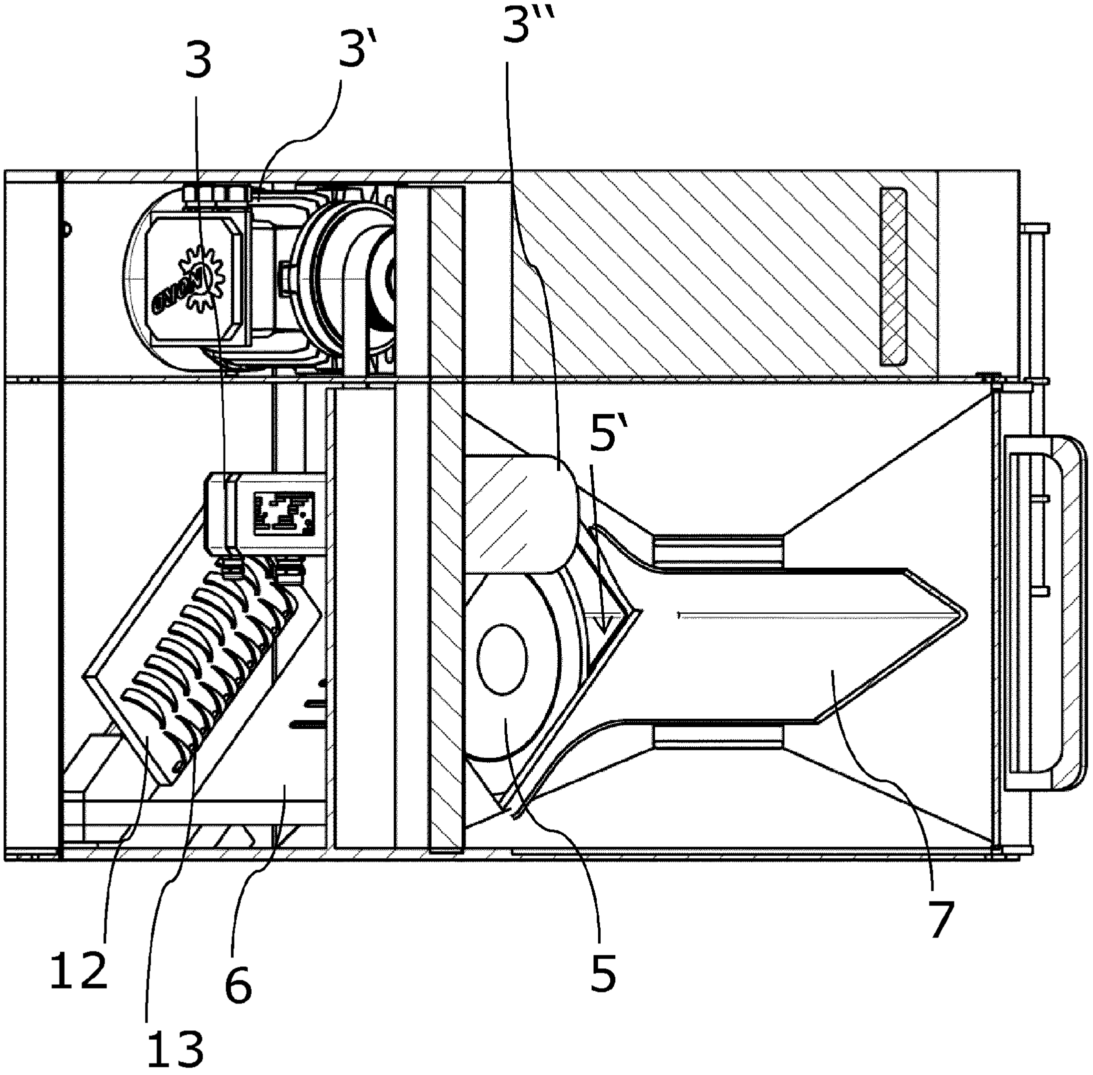
FIG. 7 is a schematic sectional view from above of an embodiment of the bread slicer according to the present disclosure.
Figure 8:
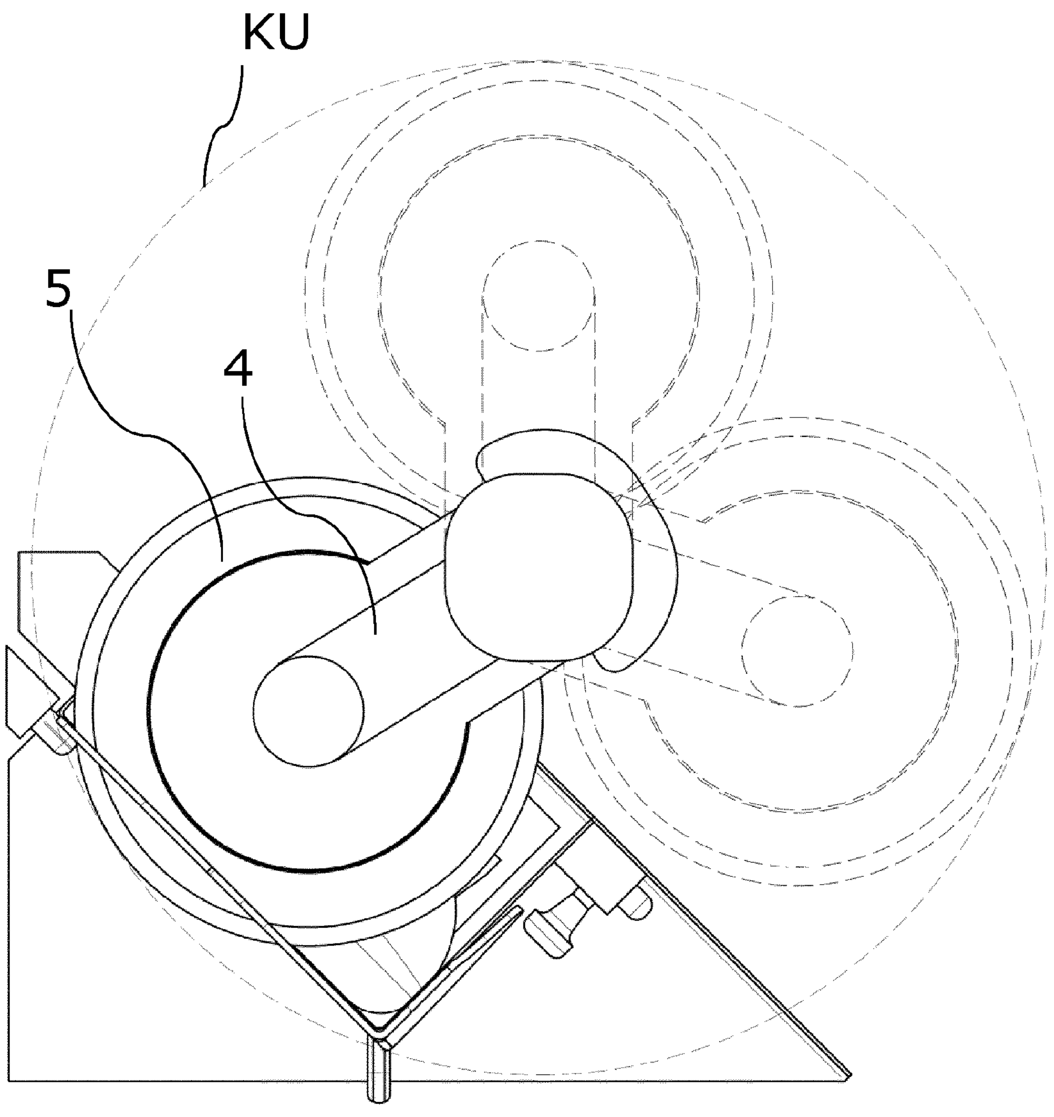
FIG. 8 shows a possible movement path of the slicing blade.
Figure 9A:
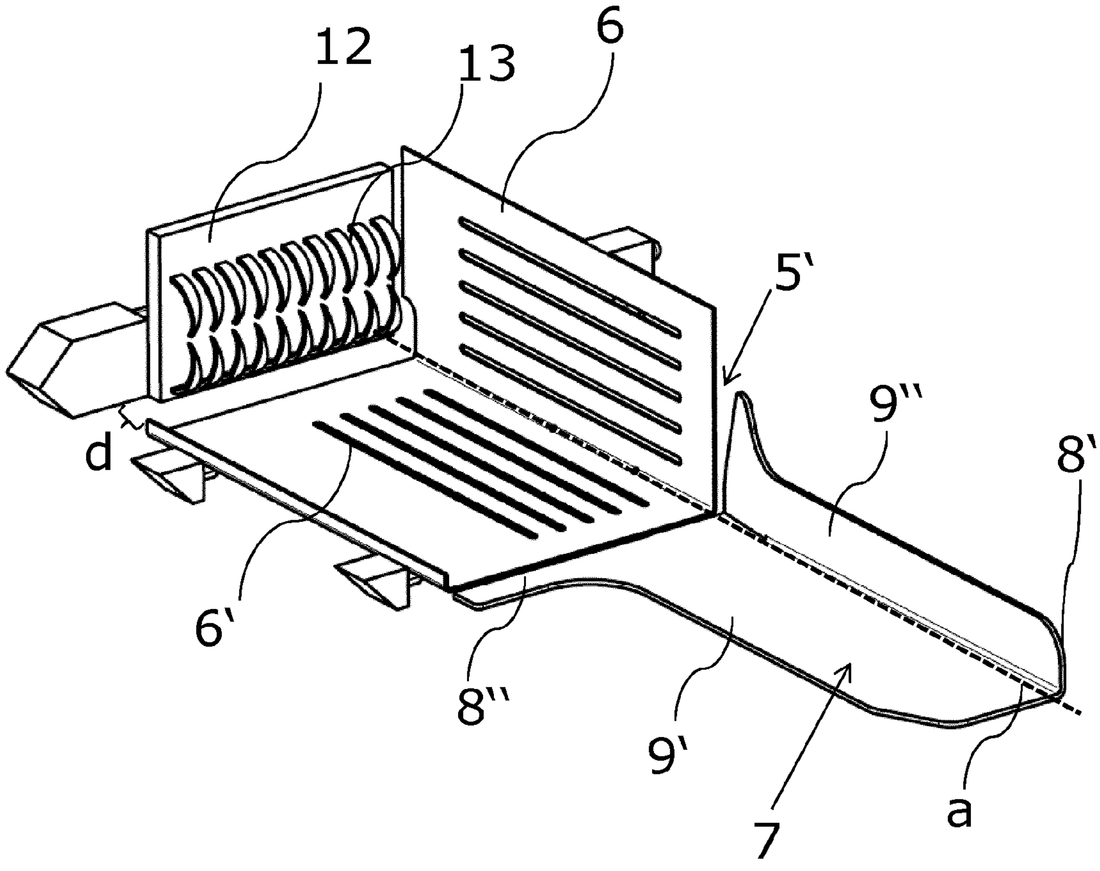
FIG. 9*a* is a three-dimensional schematic view of the feed chute, the receiving chute, and the advancing plate comprising a gripper equipped with teeth.
Figure 9B:
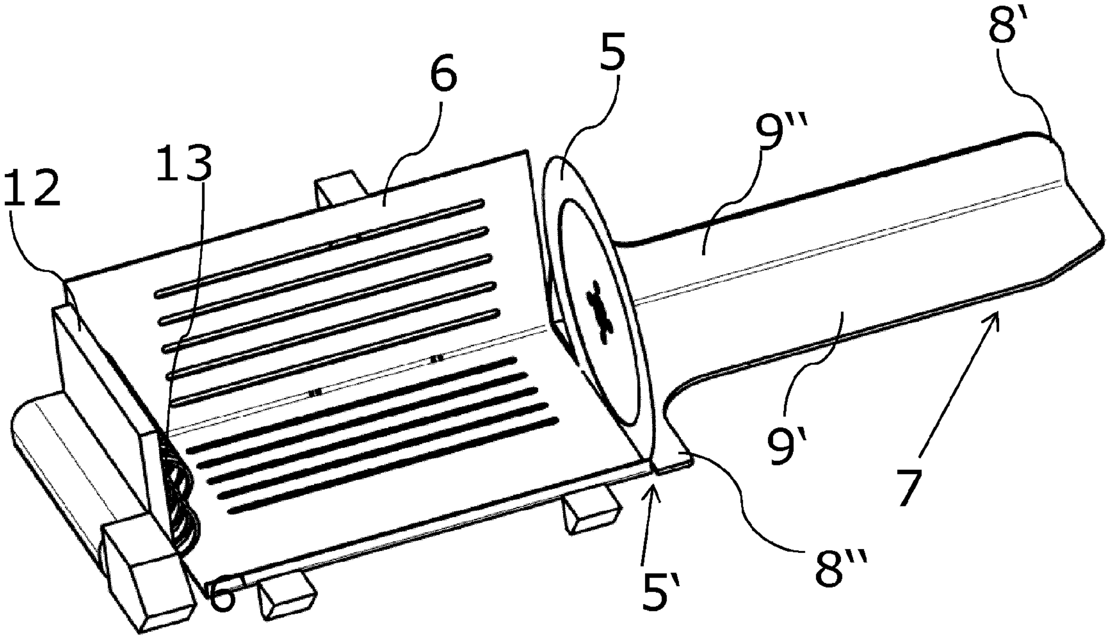
FIG. 9*b* is a three-dimensional schematic view of the feed chute and the receiving chute according to FIG. 9*a*, with the slicing blade having been inserted into the blade gap.

FIG. 1 is a section through a bread slicer according to the present disclosure, with the cover open. FIGS. 2 to 5*b* show method steps of the slicing process, with the cover closed. FIG. 6 is a three-dimensional view of a feed chute, a receiving chute, a slicing blade, and a crumb compartment of the bread slicer. FIG. 7 is a sectional view looking at the bread slicer from above (i.e., without the cover). FIG. 8 shows a possible movement path of the slicing blade. FIGS. 9*a* and 9*b* are three-dimensional views of the feed chute and receiving chute, without and with the slicing blade moved into place.

The bread slicer 1 shown in FIG. 1 has a slicer housing 2. In said slicer housing there is a drive motor 3 for driving a slicing blade 5, which is retained on a blade arm 4 (see FIG. 8) and rotates in a slicing plane E. The blade arm 4 is driven by a drive motor 3' for the blade arm 4. A bearing block 3" retains the blade arm 4.

The bread slicer 1 furthermore has a feed chute 6 for introducing a loaf of bread B (see FIG. 2) to be sliced into the bread slicer 1 through a loading region EB. A receiving chute 7 for receiving all the slices S (see FIG. 5*b*) of the sliced loaf adjoins the feed chute 6 except for a blade gap 5'. The receiving chute 7 is formed as a bagging aid having a cantilevered portion 8. The receiving chute 7 is also arranged inside a cover 2' of the slicer housing 2.

The receiving chute 7 is formed by two sheet metal portions 9', 9" that adjoin each other at an angle and together are L-shaped in cross section (cf. FIGS. 9*a* and 9*b*). A connecting axis a between the feed chute 6 and the receiving chute 7 is arranged in a manner inclined with respect to the vertical, preferably by approximately 45°. Through-slots 6' are arranged in the feed chute 6 for breadcrumbs to fall through. A crumb compartment 10 is arranged below the through-slots 6' in the feed chute 6, and in particular one or more deflector sheets 11 are located above said crumb compartment. Generally, four such deflector sheets 11 project into the crumb compartment from above in a funnel-like manner.

An advancing plate 12 having a gripper 13 for holding the loaf B can travel from one end of the feed chute 6 remote from the receiving chute 7 as far as over the blade gap 5' and back again. The loaf B introduced into the feed chute 6 can rest on the advancing plate 12 by its end face.

Figure 5A:
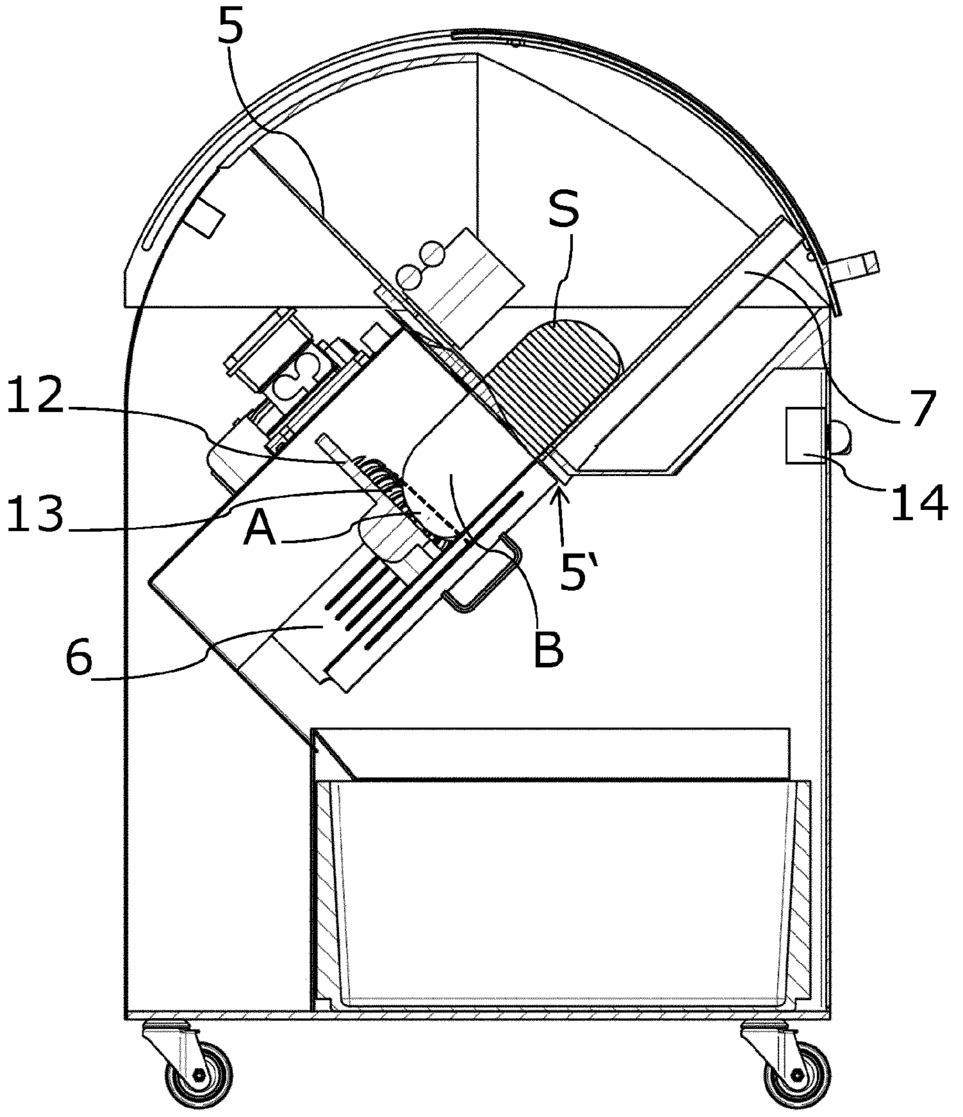
FIG. 5*a* is a section through the bread slicer according to FIG. 4, with the loaf sliced approximately halfway.
Figure 5B:
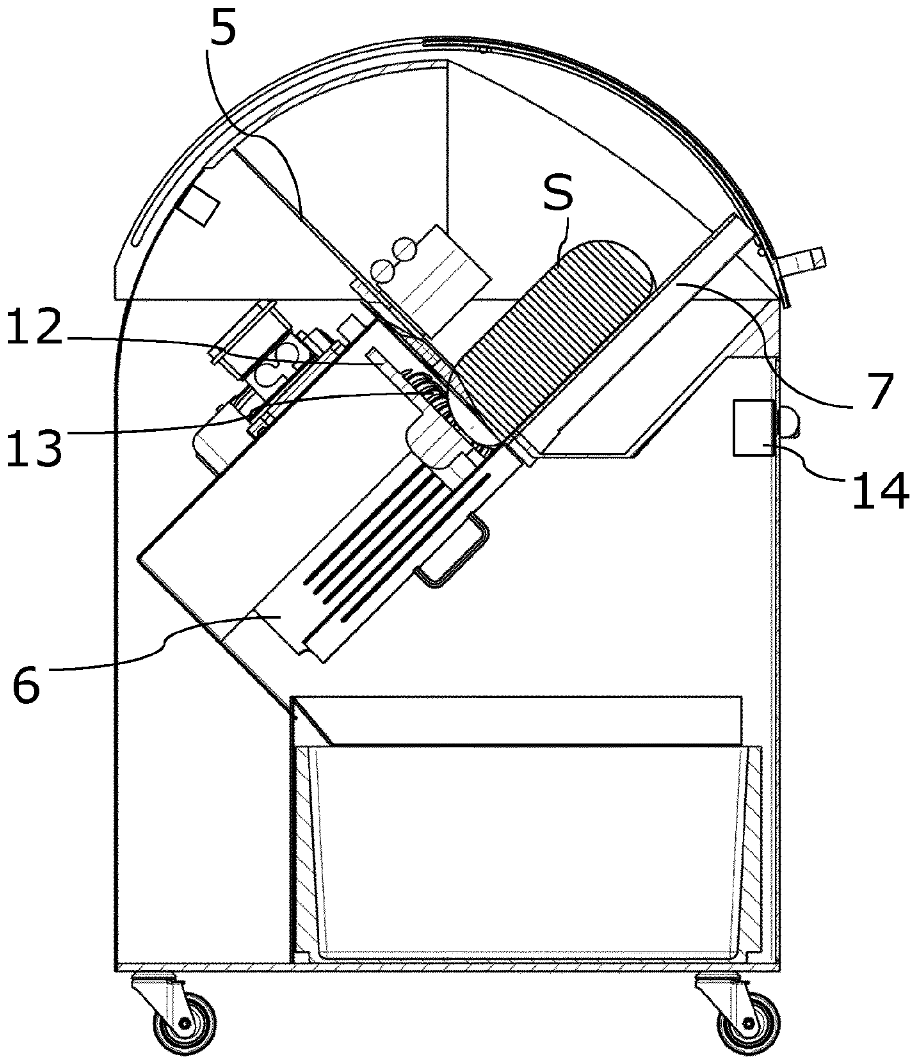
FIG. 5*b* is a section through the bread slicer according to FIG. 5*a*, with the loaf sliced except for one remaining portion.

An electronic control device 14 is configured to cause the unsliced loaf B to be transported from the receiving chute 7 into the feed chute 6 past the slicing blade 5, which has been retracted out of the blade gap 5', and then to cause the loaf B that is to be sliced to be transported back from the feed chute 6 into the receiving chute 7, the slicing blade 5 being inserted into and retracted out of the blade gap 5' during the return transportation in such a way that the loaf B is cut into parallel slices S in the process (see FIGS. 5*a* and 5*b*).

The cover 2' of the slicer housing 2 is movable in a rotational motion on a guide rail 15 in order to open and close the slicer housing 2. A sensor 16 is used to switch off the bread slicer 1, in particular the slicing blade 5, in an emergency.

Figure 2:
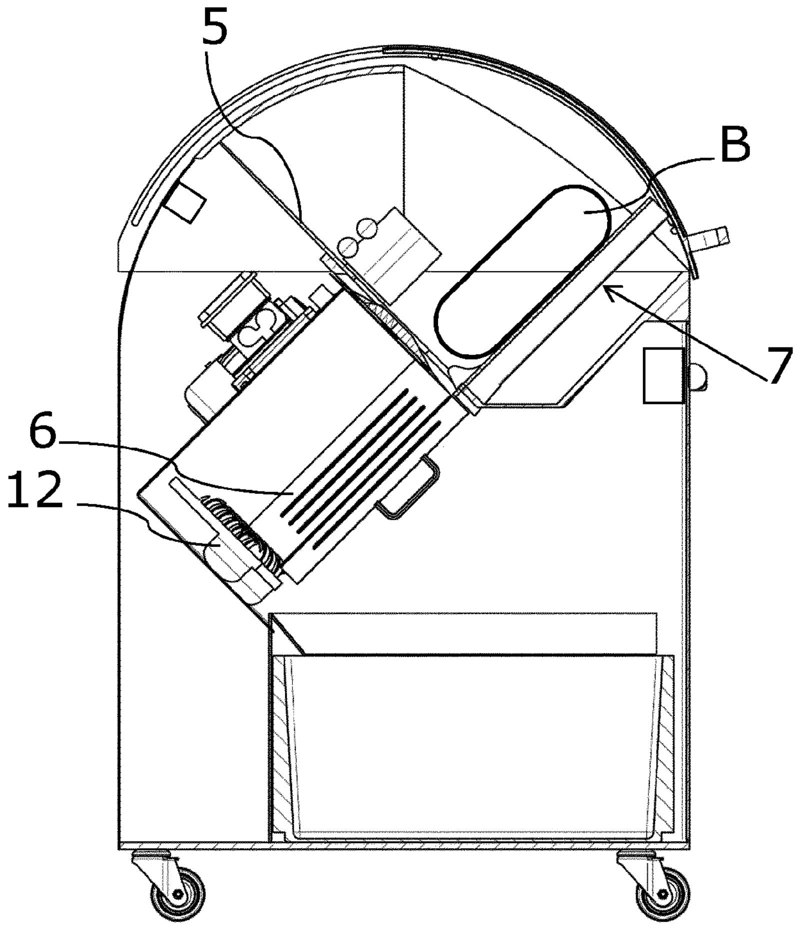
FIG. 2 is a section through the bread slicer according to FIG. 1, with a loaded loaf and the cover closed.

The initially unsliced loaf B is loaded into the receiving chute 7, as can be seen in FIG. 2.

Figure 3:
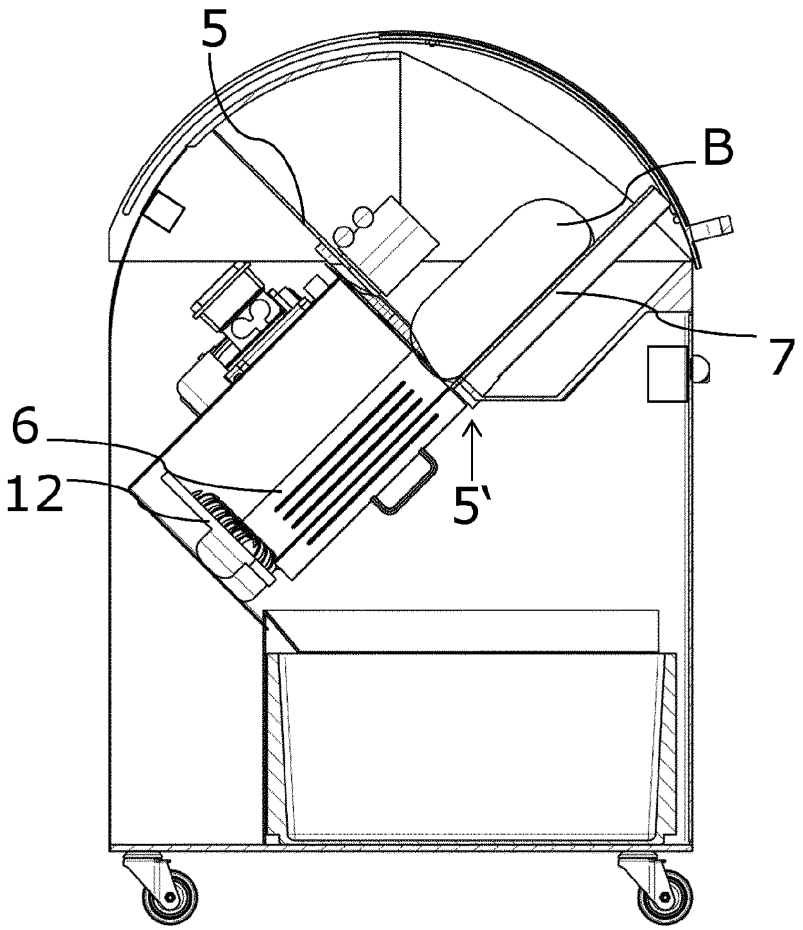
FIG. 3 is a section through the bread slicer according to FIG. 2, with the loaf resting on the slicing blade.
Figure 4:
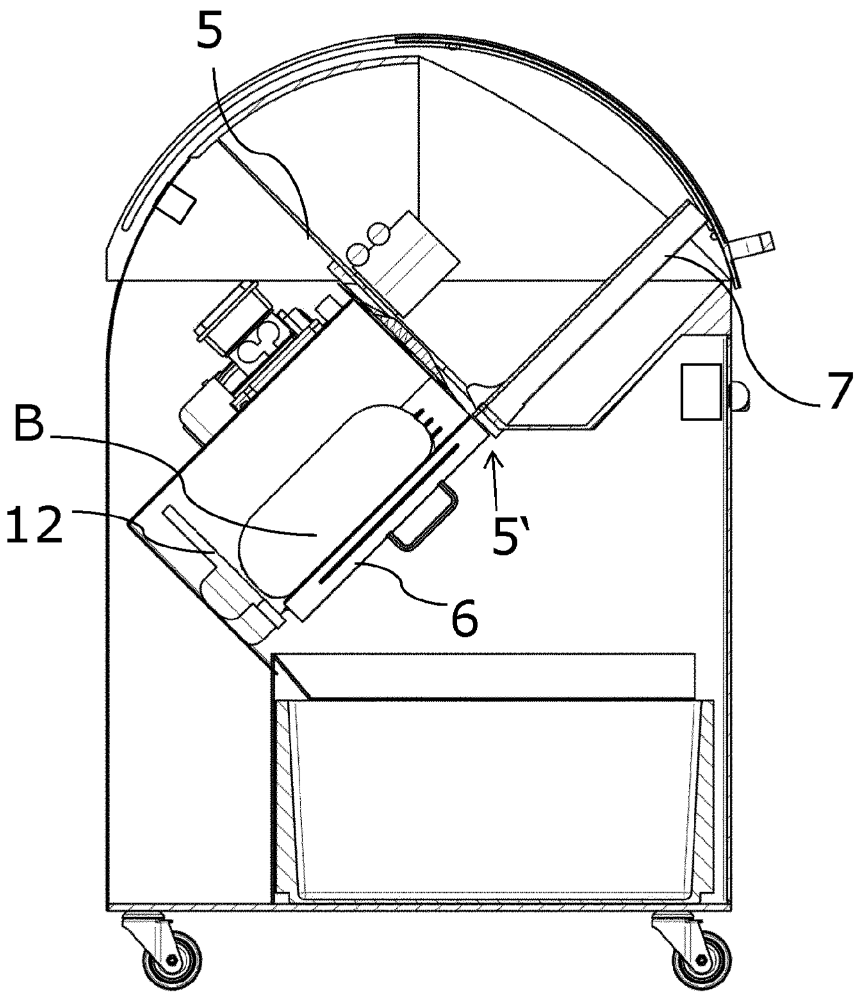
FIG. 4 is a section through the bread slicer according to FIG. 3, with the loaf resting on the advancing plate.

Next, the as-yet-unsliced loaf B slides against the slicing blade 5 in the blade gap 5'; see FIG. 3. Alternatively, the slicing blade 5 can be retracted out of the blade gap 5' and the advancing plate 12 can be moved over the blade gap 5' into the receiving chute 7, in which case the loaf B slides against the advancing plate 12. The advancing plate 12 covers the blade gap 5' and protects users of the bread slicer 1 from the slicing blade 5, in particular when the cover 2' of the bread slicer is still open.

The advancing plate 12 having the gripper 13 is moved, with the claws of the gripper 13 retracted, toward the slicing blade 5, in particular over the blade gap 5', the slicing blade 5 being retracted out of the blade gap 5' in the process. The loaf B slides against the gripper 13. The advancing plate 12 is moved, with the claws of the gripper 13 retracted, together with the loaf B which is resting by its end face on the advancing plate 12, from a starting position in the receiving chute 7 into an intermediate position at the end of the feed chute 6 remote from the receiving chute 7; see FIG. 4.

The slicing blade 5 is then moved into the blade gap 5'. The advancing plate 12 having the loaf B resting thereon is moved toward the slicing blade 5 into a striking position until the loaf B rests on the slicing blade 5. The advancing plate 12 and the slicing blade 5 secure the loaf B. Next, the claws of the gripper 13 are inserted into a securing portion A (indicated by a dashed line) of the loaf B in order to secure the loaf during the slicing process. In this case, the claws of the gripper 13 can be formed to be relatively small, as a result of which the end piece of the sliced bread can then be kept particularly thin later on.

The still-unsliced loaf B is conveyed into the receiving chute 7 over the blade gap 5' in multiple stages. In the process, the electronic control device 14 causes the slicing blade 5 to move into the blade gap 5' multiple times automatically during the step-by-step transportation in order to cut off one slice S from the loaf B each time. The slicing blade 5 is then moved fully out of the blade gap 5' again each time in order to allow each slice S to be transported onward into the receiving chute 7 and to allow the rest of the loaf B that is still unsliced at this time to be transported onward over the blade gap 5'; see FIG. 5*a*.

Lastly, the loaf, which has been sliced except for an end piece, in particular the securing portion A, is located back in the receiving chute 7, which is formed as the bagging aid having the cantilevered portion 8, and can be conveniently and safely removed therefrom; see FIG. 5*b*. In particular, the slicing blade 5 is retracted out of the blade gap 5'. The advancing plate 12 is moved over the blade gap 5' into the receiving chute 7 and covers the blade gap 5'. As a result, users of the bread slicer 1 cannot accidentally reach into the blade gap 5' and injure themselves on the sharp slicing blade 5. The claws of the gripper 13 are moved out of the loaf B.

The deflector sheet 11 is arranged on the crumb compartment 10 obliquely to the horizontal so as to deflect crumbs into the crumb compartment 10; see FIG. 6.

FIG. 7 shows in particular the drive motor 3 for the slicing blade 5, the drive motor 3' for the blade arm 4, and the bearing block 3" that retains the blade arm 4. The slicing blade 5 can be inserted into the blade gap 5' from the side.

In this case, the blade arm 4 is configured to move the slicing blade 5 on a curve KU, preferably a circular curve.

In the process, the rotating slicing blade 5 is periodically inserted into and retracted back out of the blade gap 5' in order to cut off the slices S, in particular in a constant circular motion induced by the drive motor 3' for the blade arm 4; see FIG. 8.

The L profile of the receiving chute 7, which is formed by the two sheet metal portions 9', 9" that adjoin each other at an angle, is shown in detail in FIGS. 9*a* and 9*b*. In this context, in FIG. 9*b* the slicing blade 5 is inserted into the blade gap 5'. The advancing plate 12 can travel so far that a spacing d is formed between the advancing plate 12 and the feed chute 6; see FIG. 9*a*.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Bread slicer
2 Slicer housing
2' Cover
3 Drive motor for the slicing blade
3' Drive motor for the blade arm
3" Bearing block for the blade motor
4 Blade arm
5 Slicing blade
5' Blade gap
6 Feed chute
6' Through-slots
7 Receiving chute
8 Cantilevered portion
8' Free end of the cantilevered portion
8" Receiving-chute end facing the feed chute
9', 9" Sheet metal portions
10 Crumb compartment
11 Deflector sheets
12 Advancing plate
13 Gripper
14 Electronic control device
15 Guide rail
16 Sensor
a Connecting axis between the feed chute and the receiving chute
B Loaf of bread
d Spacing from the gripper to the feed chute
E Slicing plane
S Slices
KU Curve

The invention claimed is:

1. A bread slicer for cutting an unsliced loaf of bread into a sliced loaf of bread comprising slices, the bread slicer comprising:
- a slicer housing, which accommodates a drive motor and a slicing blade, which is configured to be driven by the drive motor, retained on a blade arm, and configured to rotate in a slicing plane or is movable in a circulating manner, the slicer housing comprising:
  - a feed chute configured to introduce the unsliced loaf of bread that is to be sliced into the bread slicer; and
  - a receiving chute, which adjoins the feed chute except for a blade gap, for receiving all of the slices of the sliced loaf; and
- a bagging aid configured for slipping or pulling a bag-like packaging over the bagging aid together with the slices of the sliced loaf that are resting thereon, the bagging aid comprising a cantilevered portion, wherein:
- external dimensions of the feed chute in directions parallel to the slicing plane are selected to be greater than or equal to maximum external dimensions in directions of loaves to be sliced,
- external dimensions of the cantilevered portion in the directions parallel to the slicing plane are, at least at a free end remote from the feed chute, selected to be smaller than external dimensions of the feed chute in the directions parallel to the slicing plane, and
- the receiving chute is formed as the bagging aid having the cantilevered portion and is arranged inside a cover of the slicer housing, and wherein the bread slicer further comprises an electronic control device, which is configured to control the bread slicer in order to:

cause the unsliced loaf, which has been introduced into the receiving chute, to be transported from the receiving chute into the feed chute past the slicing blade, which has been retracted out of the blade gap, then move the slicing blade into the blade gap, cause the unsliced loaf to be moved into a striking position by moving an advancing plate until the unsliced loaf rests on the slicing blade that is in the blade gap, thereby causing the unsliced loaf to be secured between the advancing plate and the slicing blade, insert claws of a gripper into a securing portion of the unsliced loaf while the unsliced loaf is secured between the advancing plate and the slicing blade, then retract the slicing blade out of the blade gap, and then cause the unsliced loaf that is to be sliced to be transported back from the feed chute into the receiving chute, the slicing blade being inserted into and retracted out of the blade gap during the return transportation in such a way that the unsliced loaf is sliced into the sliced loaf, the slices being in parallel, during the transporting back process.

2. The bread slicer according to claim 1, wherein the receiving chute is formed by two sheet metal portions that adjoin each other at an angle and together are L-shaped in cross section.

3. The bread slicer according to claim 1, wherein, in parallel with the slicing plane, the receiving chute is, at its end facing the feed chute, almost as wide as the feed chute in that region.

4. The bread slicer according to claim 1, wherein a connecting axis between the feed chute and the receiving chute is arranged in a manner inclined with respect to the vertical.

5. The bread slicer according to claim 1, wherein the blade arm is configured to move the slicing blade on a curve.

6. The bread slicer according to claim 1, wherein through-slots are arranged in the feed chute for breadcrumbs to fall through.

7. The bread slicer according to claim 6, wherein a crumb compartment, having a deflector sheet, is arranged below the through-slots in the feed chute.

8. The bread slicer according to claim 1, the bread slicer comprising the advancing plate, which comprises the gripper for holding the loaf, the advancing plate being configured to travel from one end of the feed chute remote from the receiving chute as far as over the blade gap and back again, and on which the loaf introduced into the feed chute rests by its end face.

9. The bread slicer according to claim 1, wherein the slicing blade, when in a non-activated state outside of the blade gap, is arranged in the bread slicer so as to be impossible to touch from outside of the cover of the slicer housing.

10. The bread slicer according to claim 1, wherein the receiving chute is arranged such that, before the slicing process, the unsliced loaf can be placed onto the cantilevered portion by a user, and in that, after the slicing process, the slices of the sliced loaf can be removed from the cantilevered portion by the user, after having pulled a bag-like packaging thereover.

11. The bread slicer according to claim 1, wherein the bread slicer has a shorter side and a longer side, the cantilevered portion being accessible to a user from the shorter side of the bread slicer.

12. The bread slicer according to claim 1, wherein the cover of the slicer housing is movable in a rotational motion on a guide rail.

13. The bread slicer according to claim 1, wherein bread slicer further comprises a sensor configured for switching off the slicing blade of the bread slicer in an emergency.

14. A bread slicing method for cutting off slices from an unsliced loaf of bread using the bread slicer according to claim 1, the method comprising:

a) transporting the unsliced loaf of bread, which was first received in the receiving chute, from the receiving chute, past the slicing blade, which has been retracted out of the blade gap, into the feeding chute, thereby introducing the unsliced loaf into the feed chute via the receiving chute;

b) moving the slicing blade into the blade gap;

c) moving the unsliced loaf into a striking position by moving an advancing plate until the unsliced loaf rests on the slicing blade that is in the blade gap, thereby causing the unsliced loaf to be secured between the advancing plate and the slicing blade;

d) inserting claws of a gripper into a securing portion of the unsliced loaf while the unsliced loaf is secured between the advancing plate and the slicing blade;

e) retracting the slicing blade out of the blade gap f) transport back the unsliced loaf that is to be sliced from the feed chute into the receiving chute, and during the return transportation, cutting the unsliced loaf into the sliced loaf having the slices by repeatedly inserting the slicing blade into the blade gap and retracting the slicing blade out of the blade gap to incrementally slice portions of the unsliced loaf as it moves past the blade gap, each of the slices being in parallel;

g) conveying the slices to the cantilevered portion of the receiving chute;

h) pulling a bag-like packaging over the bagging aid of the cantilevered portion together with the slices of the sliced loaf that are resting thereon, while the cover of the slicer housing is open;

i) removing the bag-like packaging, together with the slices of the sliced loaf contained therein, from the cantilevered portion.

15. A bread slicer for automatically cutting an unsliced loaf of bread into a sliced loaf of bread comprising a plurality of parallel slices, the bread slicer comprising:

a receiving chute configured to receive the unsliced loaf from outside of a slicer housing, and comprising a bagging aid configured to support the sliced loaf comprising all of the slices, and a bag-like packaging being slippable or pullable simultaneously over the bagging aid and the sliced loaf in a condition where the sliced loaf is resting on the bagging aid;

a feed chute that adjoins the receiving chute except for a blade gap;

a slicing blade, which is configured to be controllably driven by a slicing blade drive motor, is configured to be controllably rotated in a slicing plane or to be controllably moved in a circulating manner in the slicing plane to slice the unsliced loaf, and is configured to be controllably inserted into and retracted out of the blade gap, the slicing plane being arranged in the blade gap;

an advancing plate that is configured to controllably travel from one end of the feed chute remote from the receiving chute, over the blade gap, and back to the one end, the advancing plate comprising a gripper comprising claws; and an electronic control device, which is configured to control the bread slicer in order to:

prior to receiving the unsliced loaf, either position the slicing blade in the blade gap, or retract the slicing blade out of the blade gap and position the advancing plate beyond the blade gap in the receiving chute;

after receiving the unsliced loaf in the receiving chute, either, beginning in a state where the unsliced loaf is resting against a face of the slicing blade, moving the advancing plate toward the unsliced loaf over the blade gap, with a concurrent retraction of the slicing blade from the blade gap, until the unsliced loaf is resting on the advancing plate, and then moving the advancing plate to the one end of the feed chute remote from the receiving chute until that the unsliced loaf is in the feed chute entirely on a side of the blade gap remote from the receiving chute, or beginning in a state where the unsliced loaf is resting against the advancing plate, moving the advancing plate to the one end of the feed chute remote from the receiving chute such that the unsliced loaf is in the feed chute and the unsliced loaf is in the feed chute entirely on the side of the blade gap remote from the receiving chute;

moving the slicing blade into the blade gap;

causing the unsliced loaf to be moved into a striking position by moving the advancing plate until the unsliced loaf rests on the slicing blade that is in the blade gap, thereby causing the unsliced loaf to be secured between the advancing plate and the slicing blade;

inserting the claws of the gripper into a securing portion of the unsliced loaf while the unsliced loaf is secured between the advancing plate and the slicing blade;

retracting the slicing blade out of the blade gap;

moving the advancing plate toward the receiving chute while repeatedly inserting the slicing blade into and out of the blade gap to slice the unsliced loaf into the plurality of slices creating the sliced loaf; and stopping the advancing plate over the blade gap such that the entire sliced loaf is resting on the bagging aid, wherein:

external dimensions of the feed chute in directions parallel to the slicing plane are selected to be greater than or equal to maximum external dimensions in directions of loaves to be sliced, external dimensions of a cantilevered portion of the bagging-aid, in the directions parallel to the slicing plane, are, at least at a free end remote from the feed chute, smaller than the external dimensions of the feed chute in the directions parallel to the slicing plane.

* * * * *